(12) United States Patent
Bryan (10) Patent No.: US 7,420,893 B2
(45) Date of Patent: Sep. 2, 2008

(54) LOW SEEK TIME OPTICAL MEDIA TRACKING SYSTEM

(75) Inventor: Robison J. Bryan, North Hills, CA (US)

(73) Assignee: Discovision Associates, Long Beach, CA (US)

( * ) Notice: Subject to any disclaimer, the term of this patent is extended or adjusted under 35 U.S.C. 154(b) by 442 days.

(21) Appl. No.: 10/905,231

(22) Filed: Dec. 22, 2004

(65) Prior Publication Data

US 2006/0133229 A1   Jun. 22, 2006

(51) Int. Cl.
*G11B 7/00* (2006.01)
(52) U.S. Cl. .............................. 369/44.23; 369/112.23; 369/44.28
(58) Field of Classification Search .............. 369/44.23, 369/112.23, 112.24
See application file for complete search history.

(56) References Cited

U.S. PATENT DOCUMENTS

| 5,504,731 | A | * | 4/1996 | Lee et al. ................ 369/112.24 |
| 5,646,928 | A | * | 7/1997 | Wu et al. ................ 369/112.24 |
| 5,737,300 | A | * | 4/1998 | Ota et al. ................ 369/112.24 |
| 7,200,097 | B2 | * | 4/2007 | Meyrueis et al. ............ 369/103 |
| 2004/0264358 | A1 | * | 12/2004 | El Hafidi et al. ......... 369/275.3 |

* cited by examiner

*Primary Examiner*—Wayne Young
*Assistant Examiner*—Van T Pham
(74) *Attorney, Agent, or Firm*—Steve A. Wong (57) ABSTRACT

The present invention provides a system for causing an optical beam to impinge on a spot on an optical medium, while keeping an optical head apparatus in an essentially stationary position, such that it eliminates the need for a tracking function to move an optical head apparatus in order to direct an optical beam between tracks or to an location on the optical medium.

34 Claims, 8 Drawing Sheets

LOW SEEK TIME OPTICAL MEDIA TRACKING SYSTEM

FIELD OF THE INVENTION

The present invention relates generally to optical media players and/or recorders.

BACKGROUND OF THE INVENTION

Optical media players and recorders, such as current compact disc (CD) and digital video disc (DVD) systems operate generally by directing an optical beam from a source, causing the beam to contact a specific location on an optical medium where data is stored, and receiving the data via the reflection of the beam back to receiving devices. To make this happen, current systems are required, at least, to perform two necessary functions, which are tracking and focusing.

Focusing involves fine-tuning the manner in which the optical beam impinges upon the optical medium. Tracking involves placing the beam (and consequently the source of the beam) in a specific location so it will impinge upon the optical medium in the appropriate place. Thus, in a current optical media player and/or recorder, the optical media typically is rotated and an optical beam is continually both focused onto the media and moved (using tracking functionality) to the appropriate place on the media, so that the data can be reflected back to a receiving device and output, for instance to a speaker and/or a television.

Figure 1:
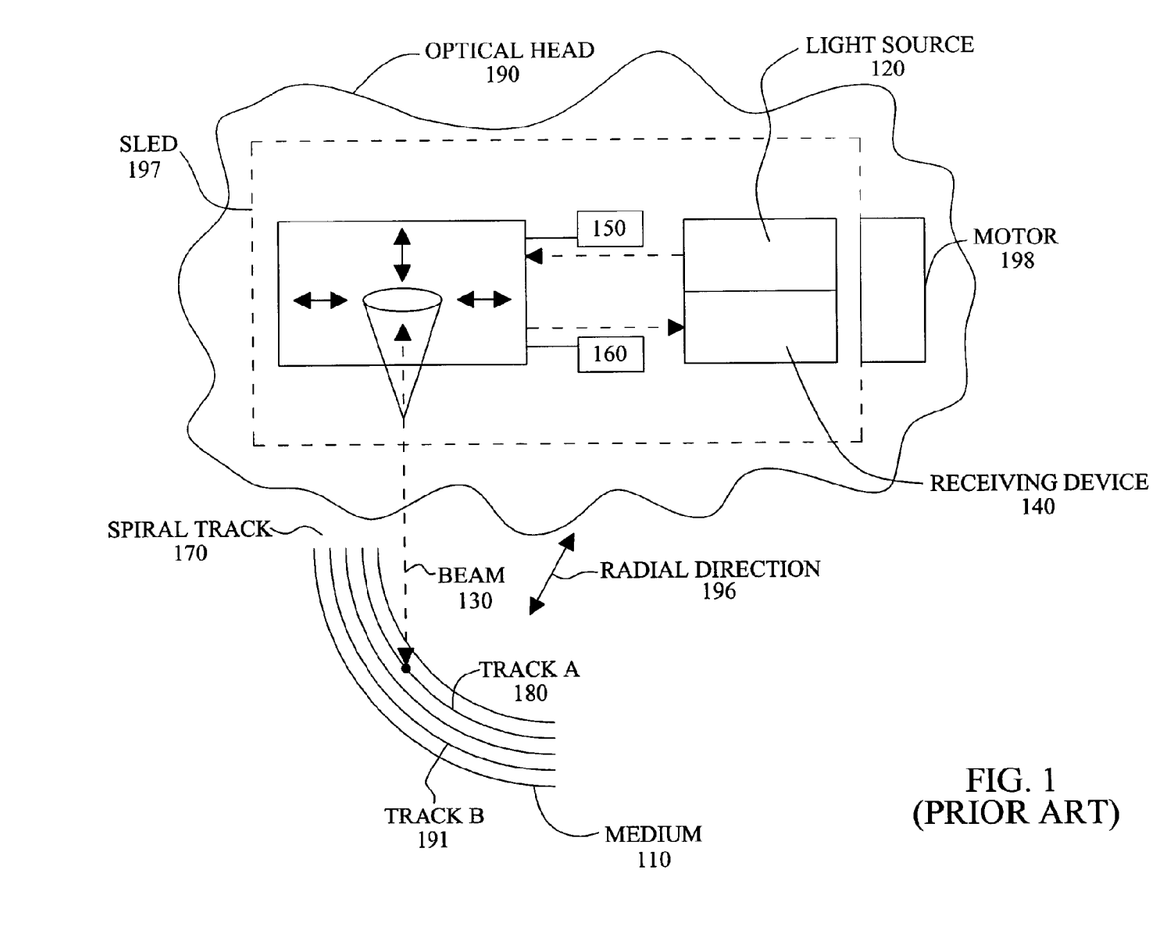
FIG. 1 is a prior art optical media player.

Therefore, a current optical media player operates generally as shown in FIG. 1 in order to allow a user to listen to a song or watch a movie. The player 100 holds an optical medium 110, such as a CD or DVD. The medium 110 is caused to spin, and a light source 120 directs an optical beam 130 to the medium 110. The beam 130 then reflects back to a receiving device 140 where a focusing function 150 and a tracking function 160 work in tandem to make beam 130 both the in the right shape and in the right place. As time passes (through a combination of spinning the medium 110 and the tracking function 160), the beam 130 may be directed across the entire spiral track 170 so that the entire CD or DVD can be watched, recorded, and/or listened to. Similarly, the beam 130 can be moved between tracks, for instance track A 180 and track B 191, when the user jumps between scenes and/or songs.

Current tracking systems involve moving the light source 120, typically an optical head apparatus 195 along the disc in the radial direction 196 using a sled 197. A motor 198 is usually used to apply the force needed to move the optical head apparatus 195 in the radial direction 196. This was considered necessary in order to finally focus the beam to a point on a disc via an objective lens in the optical head apparatus 195.

When nearly instant data access is of utmost importance, the time it takes for the motor 198 to move the optical head apparatus 195 to the appropriate location in the radial direction 196 is problematic, specifically when it needs to jump between tracks. Additionally, when the player and/or recorder is first turned on, the time it takes to cause the disc to initially begin rotating is also lengthy.

Thus, re-writable optical recorders have consistently had drawback s that have prevented them from being used as an alternative storage medium to replace the hard disc. Some have proposed using a voice coil to move the optical head instead of a motor, yet the optical head is still massive enough that even with a very powerful voice coil, the movement is slow and cumbersome, resulting in fairly long seek times. This results in a delay when moving between tracks or when the player is turned on and play begins, which can be problematic.

SUMMARY OF THE INVENTION

The present invention provides a mechanism for causing an optical beam to impinge on a spot on an optical medium, while keeping an optical head apparatus in a fixed position, so that it is no longer necessary for a tracking function to move a heavy, cumbersome sled (and its attached optical head apparatus) in order to move an optical beam between tracks or to an arbitrary location on the optical medium.

In one embodiment of the present invention, a conventional optical head has its motion in the radial direction fixed, but otherwise operates as a conventional optical head, including precision movements in at least two dimensions, so that it can still perform the conventional operations of focusing and fine-tracking to keep the beam focused on the desired track on the optical medium. A re-collimating lens directs the beam to a rotating mirror assembly, which guides the beam to a planar optical element. Planar optical element comprises a micro-array of final objective lenses, which eventually guide the beam to its final destination.

In another embodiment, the rotating mirror assembly comprises multiple mirrors, which can be used on an optical medium that is stationary, rather than spinning. Similarly, the rotating mirror assembly might include a spinning polygon assembly that allows for a scanning of entire lines in an x-y grid of information on a stationary optical medium.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

The present invention provides a mechanism for causing an optical beam to impinge on a spot on an optical medium, while keeping an optical head apparatus in an essentially fixed position. In this configuration, it is no longer necessary for a tracking function to initiate the movement of a heavy, cumbersome sled (and its attached optical head apparatus) in the radial dimension, in order to move an optical beam between tracks or to an arbitrary location on the optical medium.

In one embodiment of the present invention, a conventional optical head has its motion in the radial direction fixed, but otherwise operates as a conventional optical head, including precision movements in at least two dimensions, so that it can still perform the conventional operations of focusing and fine-tracking to keep the beam focused on the desired track on the optical medium. A re-collimating lens directs the beam to a rotating mirror assembly, which guides the beam to a planar optical element. Planar optical element comprises a micro array of final objective lenses, which eventually guide the beam to its final destination on a medium. This embodiment of the present invention is shown with respect to FIG. 2.

Figure 2:
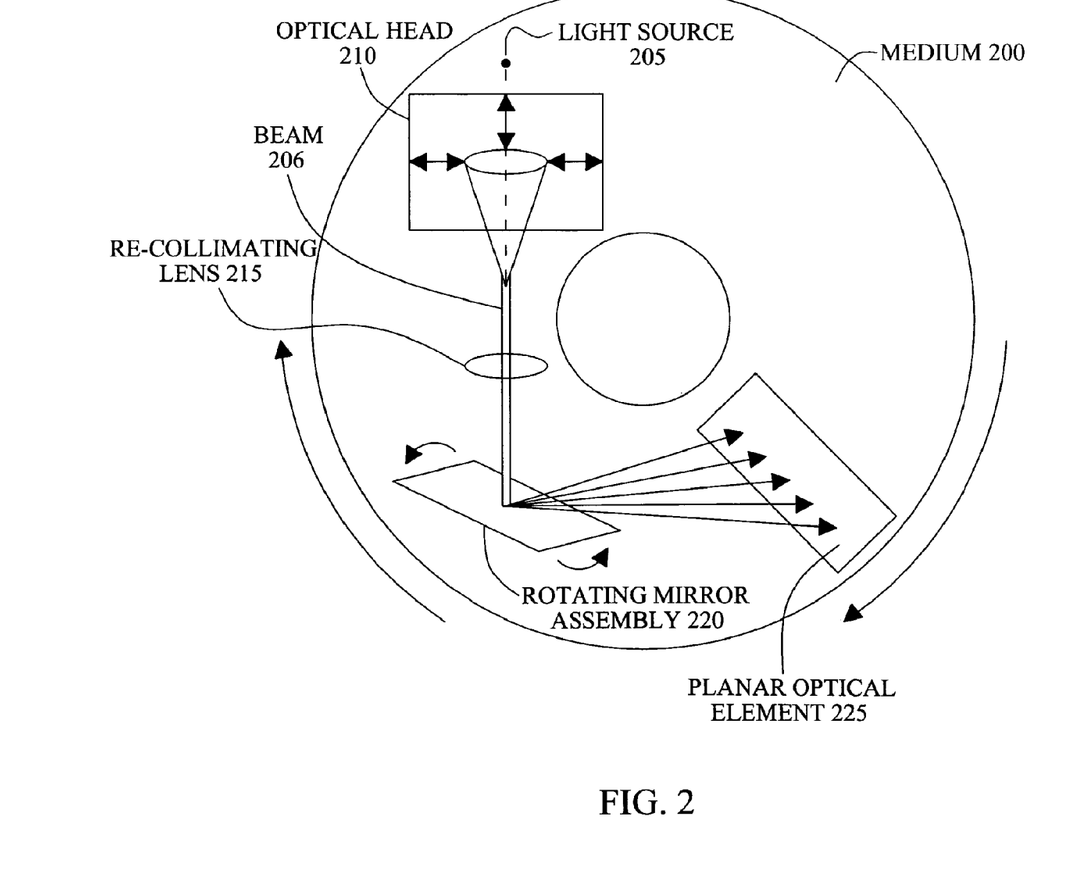
FIG. 2 is a low seek time optical media tracking system according to one embodiment of the present invention.

In FIG. 2 a medium 200 is rotated in a manner that is conventional to current optical media players. A light source 205 causes a beam 206 to pass through optical head 210, which is similar to a conventional optical head, but has its motion in the radial direction fixed. Otherwise, optical head 210 operates as a conventional optical head, including precision movements in at least two dimensions, so that it can still perform the conventional operations of focusing and fine-tracking, to keep the beam 206 focused on the desired track on the medium 200. A re-collimating lens 215 directs the beam 206 to a rotating mirror assembly 220. The rotating mirror assembly 220 is configured to cause the beam 206 to contact a planar optical element 225 in any of a plurality of locations on its surface. Planar optical element 225 comprises a micro-array of final objective lenses, which eventually guide the beam to its final destination on the medium 200.

The re-collimating lens 215 makes the beam 206 narrow but mostly straight. Because of the operation of the re-collimating lens 215, the beam 206 converges in one dimension to be very small (e.g., one track) at the surface of the medium 200. In the other dimension the beam 206 ends up being larger (e.g., many spots wide) by the time it hits the planar optical element 225. The larger size may comprise the equivalent of several track widths. The rotating mirror assembly 220 deflects the beam 206 widely along a given path to a specific location on the medium 200 that is continually selectable in the radial dimension. The planar optical element 225 converges the beam 206 in the axial dimension and allows and/or assists the beam 206 to continue converging in the radial dimension, resulting in a small, focused circular spot upon the medium 200 (e.g., one micron) that has a fixed axial location and a continuously scannable radial location. The final focusing job performed by the planar optical element 225 affects essentially the axial focus only, leaving the radial focus unaffected and free to continue to converge onto the medium 200 at closer to the same angle it had prior to contacting the planar optical element 225, which is described in further detail below.

In another embodiment, the rotating mirror assembly comprises multiple mirrors, which can be used on an optical medium that is stationary and of arbitrary shape. This embodiment of the present invention is shown with respect to FIG. 3. A medium 300 is stationary and of arbitrary shape. The present example shows medium 300 as a rectangle (credit card shaped), but it could also be circular, for instance the present invention may read and/or write to a medium that is circular with a spiral track. The medium 300 may also be irregular in shape, three dimensional, or holographic, as long as medium 300 is capable of being scanned in a first and a second direction in a two-dimensional plane. For simplicity, these two directions are referred to as x and y, or axial and radial, which are used interchangeably.

Figure 3:
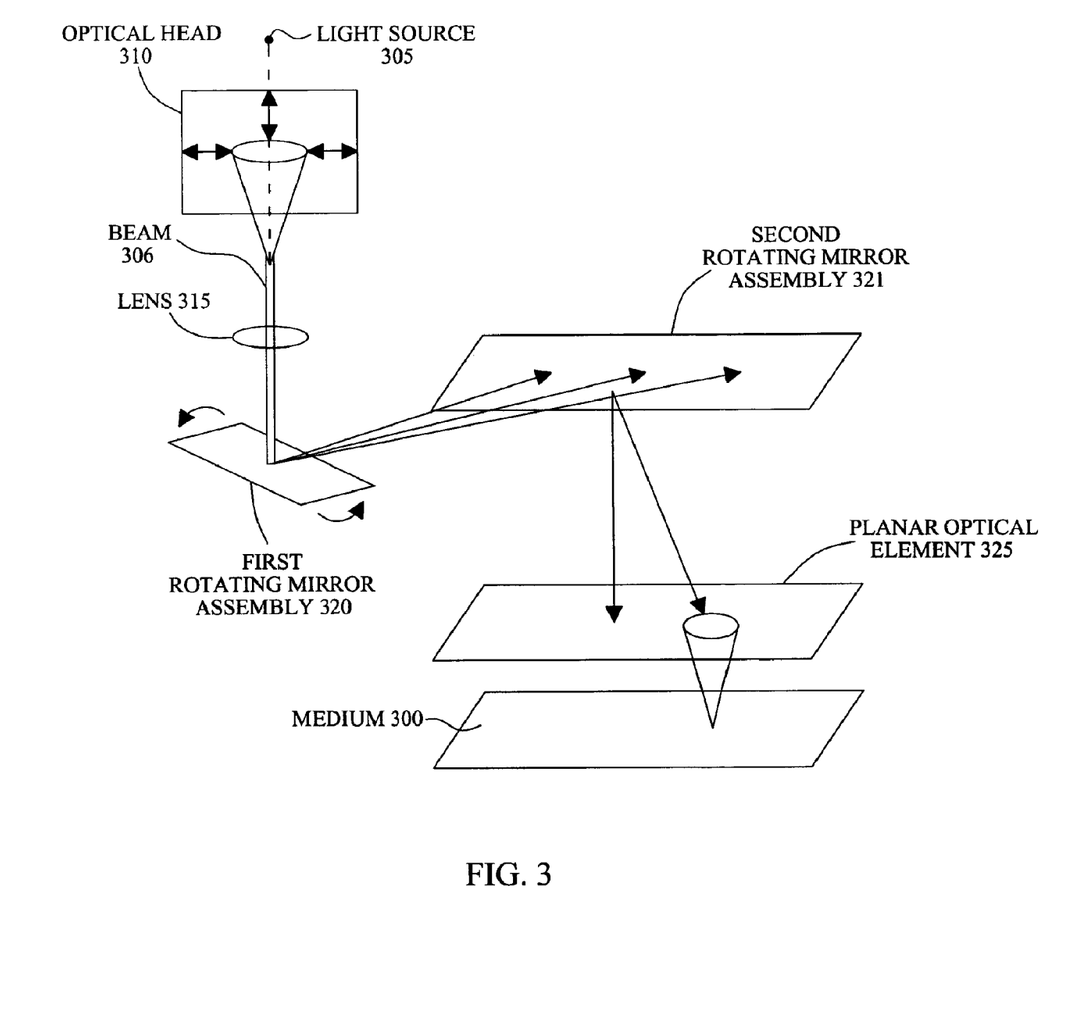
FIG. 3 is a low seek time optical media tracking system according to another embodiment of the present invention.

A light source 305 causes a beam 306 to pass through optical head 310, which is similar to optical head 210 shown with respect to FIG. 2, wherein the conventional sled for moving optical head 310 in the radial direction is removed. A re-collimating lens 315 directs the beam 306 to a first rotating mirror assembly 320. The first rotating mirror assembly 320 is configured to cause the beam 306 to contact a second rotating mirror assembly 321, which in turn causes the beam 306 to contact a planar optical element 325 in any of a plurality of locations on its surface. Planar optical element 325 comprises a micro-array of final objective lenses, which eventually guide the beam to its final destination on the medium 300. It should be known to those skilled in the art that any arbitrary rotating mirror assembly is handled by a number of mechanical solutions to affix one or more sides of the mirror to a mechanism that can rotate the mirror.

In this embodiment, the re-collimating lens 315 makes the beam 306 narrow but mostly straight. The beam 306 converges in one dimension to be around one track wide at the surface of the medium 300. The beam 306 is continuously scannable and thin along the length of the second mirror assembly 321 (e.g., radial dimension), and is wide enough to cover any concavity of the second mirror assembly 321 that may exist in the dimension of its width (e.g., axial dimension). If the second rotating mirror assembly 321 is concave in one dimension, it thus converges the beam in the axial dimension while allowing the beam to continue converging in the radial dimension. Either way, the result is a focused spot that is continuously scannable in both axial and radial dimensions on the medium 300.

Planar optical element 325 compensates for any angle that is created when the beam 306 leaves the second mirror assembly 321 and strikes the medium 300. Planar optical element 325 may be manufactured to be thick enough such that most of the distance of the thinnest part of the beam 306 is enclosed in plastic. Planar optical element 325 may be omitted or replaced with a transparent covering over the medium 300 itself, so that a significant portion of the final convergence of the beam 306 occurs within the transparent material. The second rotating mirror assembly 321 may alternatively be held within a tube or other shaped cavity within the transparent material on the medium 300 to maximize the percentage of beam convergence that occurs within the transparent material. The transparent covering may have a shape comprising a lens to correct beam angle and or linearity.

In another embodiment of the present invention, a portion of the rotating mirror assembly includes a spinning polygon assembly that allows for a scanning of entire lines in an x-y grid of information on a stationary optical medium. This embodiment of the present invention is shown with respect to FIG. 4. A medium 400 is stationary and of arbitrary shape. The present example shows medium 400 as a rectangle (credit card shaped), for purposes of example only. A light source 405 causes a beam 406 to pass through optical head 410, which is similar to optical head 210 shown with respect to FIG. 2. A re-collimating lens 415 directs the beam 406 to a first rotating mirror assembly 420. The first rotating mirror assembly 420 is configured to cause the beam 406 to contact a second rotating mirror assembly 421 (comprising a spinning polygon mirror), which in turn causes the beam 406 to contact a planar optical element 425 in any of a plurality of locations on its surface. Planar optical element 425 focuses the beam to its final destination on the medium 400.

Figure 4:
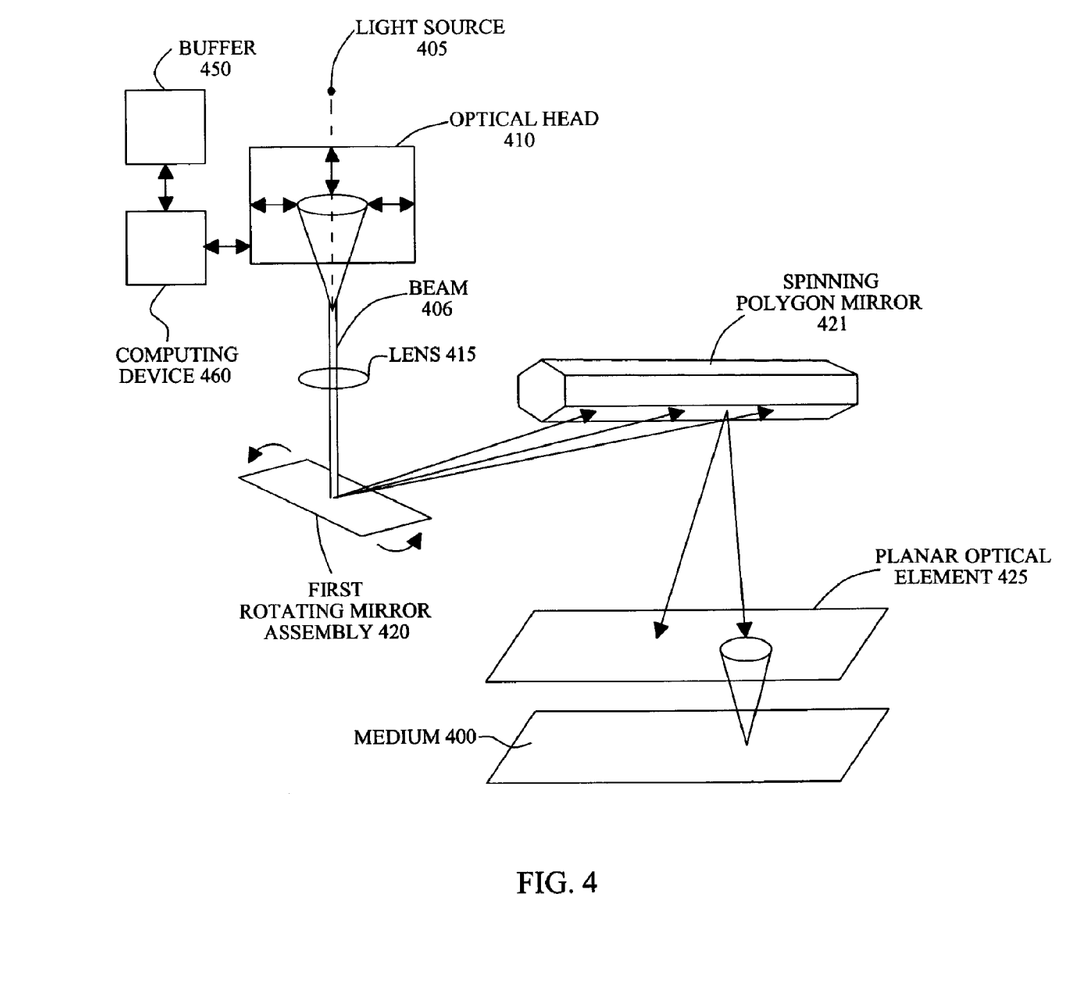
FIG. 4 is a low seek time optical media tracking system according to another embodiment of the present invention.

Since the second rotating mirror assembly 421 is polygonal in shape, the beam 406 contacts the assembly 421 along a single, planar face of the assembly 421, where each face has a concavity in the dimension of its width that focuses the beam 406 in the axial dimension. Planar optical element 425 compensates for any beam angle and/or depth of focus that is created when the beam 406 leaves the second mirror assembly 421 and strikes the medium 400. Planar optical element 425 may be manufactured to be thick enough such that most of the distance of the thinnest part of the beam 406 is enclosed in plastic. Planar optical element 425 may be omitted or replaced with a transparent covering over the medium 400 itself, so that a significant portion of the final convergence of the beam 406 occurs within the transparent material. The second rotating mirror assembly 421 may alternatively be held within a tube or other shaped cavity within the transparent material on the medium 400 to maximize the percentage of beam convergence that occurs within the transparent material. The transparent covering may have a shape comprising a lens to correct beam angle and or linearity.

Thus, the present embodiment of the invention scans a whole line in a single dimension, for instance using an orthogonal medium, such as one shaped as a credit card, for instance. A buffer 450 may be added coupled to a computing device 460 to read lines from the medium 400 and store them in the buffer 450 for later use. There may also be a running mapping of mirror coil deflection and sector address (choice of line), with equations defining the tracking and focus deviation of line from start to finish. These profiles may be retained and used to guide random seek, as well as predicted tracking waveforms required to track each specific line.

Figure 5:
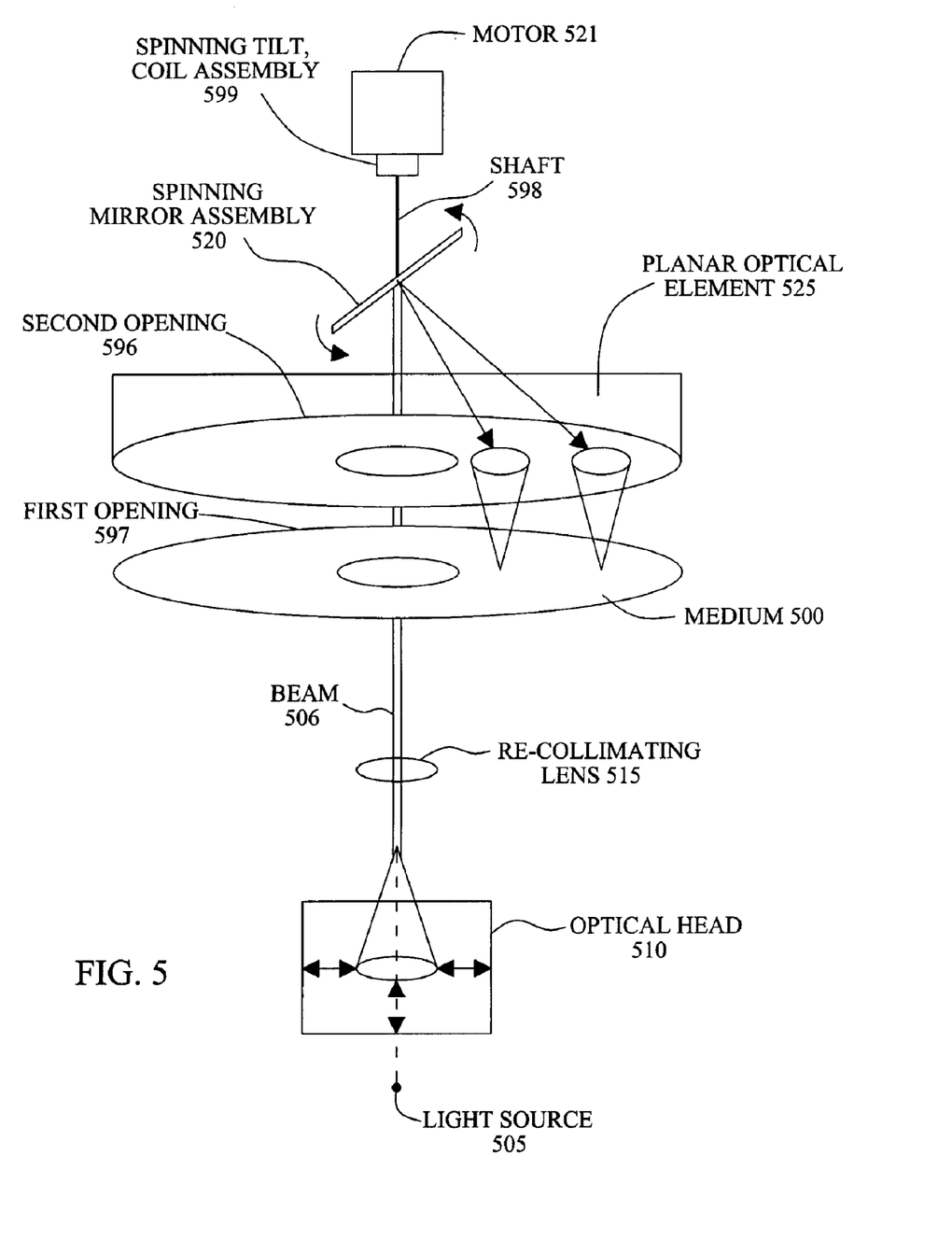
FIG. 5 is a low seek time optical media tracking system according to another embodiment of the present invention.

Another embodiment of the present invention is shown in FIG. 5. Here a rotating mirror assembly is used to replace the need to have the medium rotate. A light source 505 causes a beam 506 to pass through optical head 510, which is similar to optical head 210 shown with respect to FIG. 2. A re-collimating lens 515 directs the beam 506 through a first opening 597 on a medium 500, then through a second opening 596 on a planar optical element 525, and then to a spinning mirror assembly 520, which is moved by a motor 521. The spinning mirror assembly 520 deflects beam around a medium 500. The angle of the tilt of the mirror assembly 520 (coil mounted) locates the beam 506 radially.

The spinning mirror assembly 520 has a concavity that converges the beam 506 on its way to the medium 500. Planar optical element 525 compensates for any beam angle and/or linearity that is created when the beam 506 leaves the spinning mirror assembly 521 and strikes the medium 500. Planar optical element 525 may be manufactured to be thick enough such that most of the distance of the thinnest part of the beam 506 is enclosed in plastic. In one embodiment, there is a cavity in the plastic within which the mirror spins. This version of the present invention spins a mirror rather than the medium itself. There are a number of methods whereby the tilt current can be sent to a spinning tilt coil assembly 599. One of those could be to induce RF upon a magnetic core by coils surrounding the shaft 598.

Figure 7:
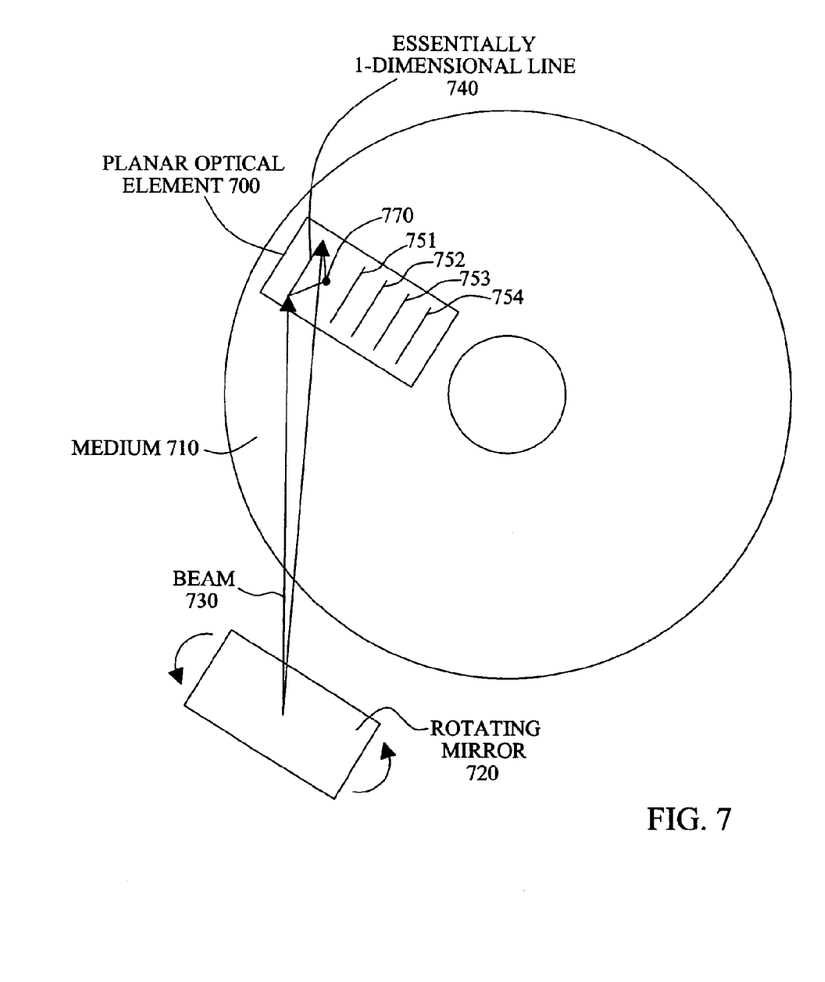
FIG. 7 is a planar optical element according to an embodiment of the present invention.
Figure 8:
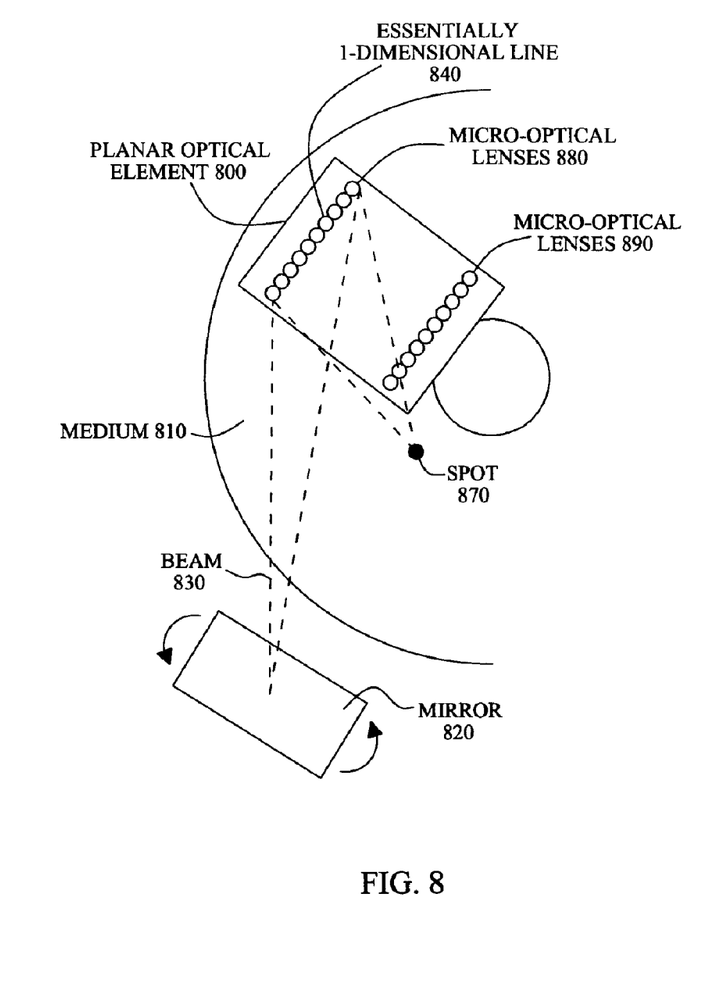
FIG. 8 is a planar optical element according to an embodiment of the present invention.

While this embodiment is well served by planar optical elements that are more or less shown in FIGS. 7 and 8, it should be understood that other embodiments are well served by planar optical elements that are more or less shown in FIG. 3, wherein a focusing operation is performed by the planar optical element in more than one dimension of focus. In such cases, it is allowable to interleave lens cells pertaining to certain tracks or spots on the media in order to accomplish the effect shown in FIG. 3.

Figure 6:
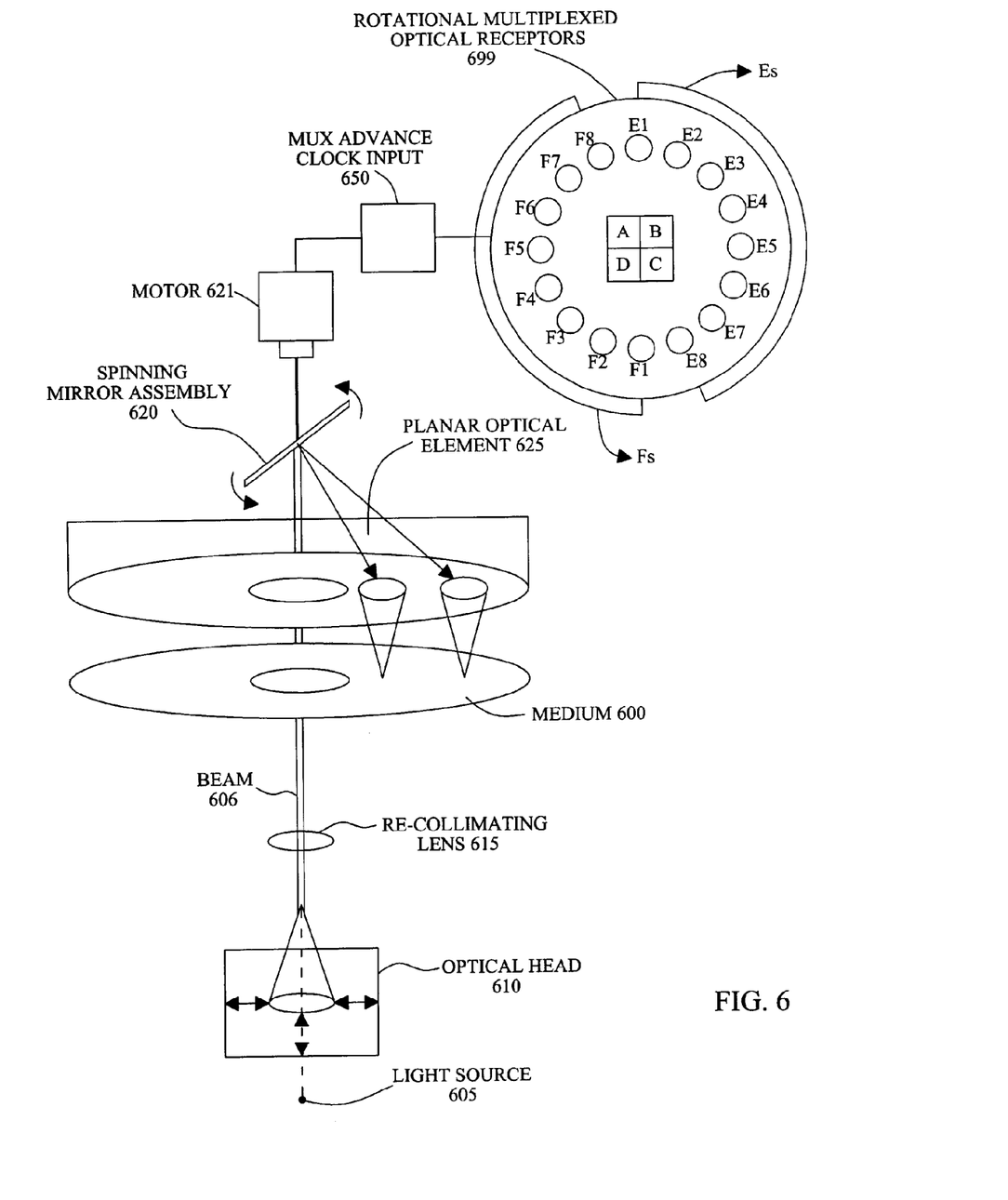
FIG. 6 is a low seek time optical media tracking system according to another embodiment of the present invention.

Another embodiment of the present invention is shown in FIG. 6. As in FIG. 5, a rotating mirror assembly is used to replace the need to have the medium rotate. A light source 605 causes a beam 606 to pass through an optical head 610. A re-collimating lens 615 directs the beam 606 to a spinning mirror assembly 620, which is moved by a motor 621. The spinning mirror assembly 620 deflects beam around a medium 600. The angle of the tilt of the mirror assembly 620 (coil mounted) locates the beam 606 radially. This embodiment differs from FIG. 5 in that a custom optical head 610 facilitates tracking as follows: a multiplex advance clock input 650 is coordinated to the rotation of the motor 621; and an active photodetector assembly multiplexes E1-F8 inputs as E and F outputs. Thus, the conventional E and F photodetectors are replaced by providing a properly rotated version of E & F, rather than using a 4 quadrant rotational understanding of A, B, C, & D. One example of a manner in which E and F outputs are obtained from E1-F8 includes taking the summation of A-D and comparing and/or dividing it with E1-F8, which is accomplished, for instance, using rotationally multiplexed optical receptors 699. At the risk of stating the obvious, in this particular preferred embodiment, the multiplexed optical receptors 699 shown in FIG. 6 are within the optical head. It should be noted however, in regard to all embodiments, that the term optical head refers to a system represented by conventional optical heads and that the sub-components of such system may or may not be together or adjacent.

FIG. 7 shows the planar optical element for certain embodiments of the present invention in more detail. Planar optical element 700 is located functionally near a medium 710. A rotating mirror 720 is used to direct a beam 730 mostly as a single dimensional line in the axial dimension 740. Single dimensional lines 751, 752, 753, and 754 are also used byway of example to illustrate how rotating mirror 720 (or its functional equivalent) is used to perform tracking actuation, which corresponds to moving the beam between tracks on the medium 710. As previously discussed, tracking detection, as opposed to actuation, is performed in the conventional manner. In this example, the proper tracking actuation function places the beam 730 on line 740, then planar optical element 700 performs the final focus, causing beam 730 to impinge on the medium 710 at spot 770. While for purposes of example, single dimensional lines 740, and 751-754 show a one-to-one correspondence to tracks on medium 710, it is understood that lines 740 and 751-754 might comprise many rows of micro-optical lenses.

FIG. 8 shows the planar optical element of the present invention in even more detail. Planar optical element 800 is located functionally near a medium 810. A rotating mirror 820 is used to direct a beam 830 mostly as a single dimensional line in the axial dimension 840. Planar optical element 800 performs the final focus, causing beam 830 to impinge on the medium 810 at spot 870. For purposes of example, single dimensional line 840 causes the beam 830 to contact substantially all of a row of micro-optical lenses 880, whereas another row of micro-optical lenses 890 corresponds to a different track on the medium 810.

One skilled in the art will note that rows 880 and 890 have been depicted as rows of single lenses, but micro-optical lenses 880 and 890 can be manufactured such that a plurality of rows can be used as the point where the single dimensional line in the axial dimension 840 contacts the planar optical element 800. Such a set-up can help compensate so that media eccentricity will not adversely affect the recovered beam amplitude as the beam tracking crosses from lens row to lens row. Each lens of the planar optical element 800 acts as a prism and as a lens, so that despite their positions, every lens within a lens row shall focus upon a single spot. Therefore, if a beam strikes ten lens rows, there shall be ten spots of focus. With respect to FIGS. 3, 4, and 5 the job of final convergence of the beam may also be performed by a curvature in the second mirror assembly rather than the planar optical element.

What is claimed is:
1. An optical media tracking system comprising:
 a pickup;

a lens;
a rotating mirror assembly; and
a planar optical element including a plurality of micro-objective lenses, positioned to receive a beam of light from said pickup, through said lens, redirected by said rotating mirror assembly to said plurality of micro-objective lenses on said planar optical element, and directed on to a medium wherein said plurality of said micro-objective lenses on said planar optical element are arranged in rows and each of said rows corresponds to a track on said medium and wherein each of said rows comprises multiple rows of said micro-objective lenses.

2. The system of claim 1 wherein said rotating mirror assembly further comprises:
a first rotating mirror assembly; and
a second rotating mirror assembly,
wherein said beam is directed between said first and second mirror assemblies such that said beam is directed essentially in a first dimension and then essentially in a second dimension via a rotation of said first and second mirror assemblies.

3. The system of claim 2 wherein said medium is rectangular, square, circular or irregular in shape.

4. The system of claim 1 wherein said medium is capable of being scanned in a first and a second dimension along an imaginary plane on a surface of said medium.

5. The system of claim 2 wherein said second rotating mirror assembly is a spinning polygon mirror assembly.

6. The system of claim 1 wherein said spinning polygon mirror assembly has a plurality of planar faces.

7. The system of claim 6, further comprising:
at least one buffer, wherein data, tracking, and focus parameters are obtained by one or more optical detectors and stored in said buffer.

8. The system of claim 1 wherein said rotating mirror assembly is a spinning mirror assembly.

9. The system of claim 8 further comprising a tilt coil coupled to said spinning mirror assembly to cause an angle of said spinning mirror assembly to change, thereby causing said beam to contact said medium at a new location.

10. The system of claim 1 wherein said multiple rows within each of said rows are contiguously adjacent.

11. The system of claim 1 wherein said multiple rows within a first one of said rows are interleaved with multiple rows within a second one of said rows.

12. The system of claim 1 wherein said arrangement of rows of said micro-objective lenses on said planar optical element is organized in more than one dimension to accomplish focus in more than one dimension.

13. A method for tracking, comprising:
causing a beam to pass through a pickup and a lens;
redirecting said beam with a rotating mirror assembly to a planar optical element,
impinging said beam onto a plurality of micro-objective lenses on said planar optical element wherein said plurality of said micro-objective lenses on said planar optical element are arranged in rows and wherein each of said rows corresponds to a track on said medium and wherein each of said rows comprises multiple rows of said micro-objective; and
focusing said beam to a specific location on a medium with said plurality of micro-objective lenses, wherein said beam is caused to converge more in a first dimension than in a second dimension, then caused to converge more in said second dimension than said first dimension.

14. The method of claim 13 wherein said medium is capable of being scanned in a first and a second dimension along an imaginary plane on a surface of said medium.

15. The method of claim 13 wherein said rotating mirror assembly is a spinning polygon mirror assembly having a plurality of planar faces, further comprising:
directing said beam substantially in a first dimension corresponding to one of said planar faces;
directing said beam from said one of said planar faces to a row of data on said medium; and
buffering said row of data.

16. The method of claim 13 wherein said rotating mirror assembly is a spinning mirror assembly.

17. The method of claim 16 further comprising:
causing an angle of said mirror assembly to change with a tilt coil coupled to said spinning mirror assembly; and
causing said beam to contact said medium at a new location.

18. The method of claim 13 wherein each of said multiple rows are contiguously adjacent.

19. The method of claim 18 wherein said arrangement of rows of said micro-objective lenses on said planar optical element is organized in more than one dimension to accomplish focus in more than one dimension.

20. The method of claim 13 wherein said multiple rows within a first one of said rows are interleaved with multiple rows within a second one of said rows.

21. The method of claim 20 wherein said arrangement of rows of said micro-objective lenses on said planar optical element is organized in more than one dimension to accomplish focus in more than one dimension.

22. The method of claim 13 wherein a portion of said step of focusing uses said planar optical element in at least said second dimension.

23. An apparatus comprising:
a pickup means for receiving a beam from a light source and modifying said beam to pass through a lens;
a rotating mirror assembly means for redirecting said beam after it passes through said lens; and
a planar optical element means having a plurality of micro-objective lenses for guiding said beam to a specific location on a medium, wherein said plurality of said micro-objective lenses on said planar optical element means are arranged in rows and each of said rows corresponds to a track on said medium and wherein each of said rows comprises multiple rows of said micro-objective lenses.

24. The apparatus of claim 23 wherein said medium is capable of being scanned in a first and a second dimension along an imaginary plane on a surface of said medium.

25. The apparatus of claim 23, further comprising:
means for buffering data received in one or more photodetectors via a reflection of said beam off of said medium.

26. The apparatus of claim 23 wherein said rotating mirror assembly means is a spinning mirror assembly means.

27. The apparatus of claim 26 further comprising a tilt coil means coupled to said spinning mirror assembly, for causing an angle of said mirror assembly to change and for causing said beam to contact said medium at a new location.

28. The apparatus of claim 23 wherein said multiple rows within each of said rows are contiguously adjacent.

29. The apparatus of claim 23 wherein said rows within a first one of said rows are interleaved with multiple rows within a second one of said rows.

30. The apparatus of claim 23 wherein said arrangement of rows of said micro-objective lenses on said planar optical element is organized in more than one dimension to accomplish focus in more than one dimension.

31. The apparatus of claim 23 wherein said rotating mirror assembly means further comprises:
a first rotating mirror assembly means; and
a second rotating mirror assembly means,
wherein said beam is directed between said first and second mirror assembly means such that said beam is directed essentially in a first single dimension and then in a second single dimension via a rotation of said first and second mirror assembly means.

32. The apparatus of claim 31 wherein said medium is rectangular, square, circular or irregular in shape.

33. The apparatus of claim 31 wherein said second rotating mirror assembly means is a spinning polygon mirror assembly.

34. The apparatus of claim 33 wherein said spinning polygon mirror assembly has a plurality of planar faces.

* * * * *